United States Patent
Kim et al.

(10) Patent No.: US 10,305,094 B2
(45) Date of Patent: May 28, 2019

(54) NEGATIVE ELECTRODE ACTIVE MATERIAL FOR RECHARGEABLE LITHIUM BATTERY, NEGATIVE ELECTRODE INCLUDING SAME, AND RECHARGEABLE LITHIUM BATTERY INCLUDING NEGATIVE ELECTRODE

(71) Applicant: Samsung SDI Co., Ltd., Yongin-si, Gyeonggi-Do (KR)

(72) Inventors: Beom-Kwon Kim, Yongin-si (KR); Woon-Suk Jang, Yongin-si (KR); Dong-Ho Son, Yongin-si (KR); Ki-Jun Kim, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 621 days.

(21) Appl. No.: 14/258,970

(22) Filed: Apr. 22, 2014

(65) Prior Publication Data
US 2014/0349180 A1    Nov. 27, 2014

(30) Foreign Application Priority Data
May 27, 2013    (KR) .................. 10-2013-0059787

(51) Int. Cl.
*H01M 4/36*    (2006.01)
*H01M 4/38*    (2006.01)
(Continued)

(52) U.S. Cl.
CPC .......... *H01M 4/366* (2013.01); *H01M 4/364* (2013.01); *H01M 4/386* (2013.01); *H01M 4/587* (2013.01);
(Continued)

(58) Field of Classification Search
CPC ....... H01M 4/133; H01M 4/134; H01M 4/364
See application file for complete search history.

(56) References Cited

U.S. PATENT DOCUMENTS 6,541,156 B1 *    4/2003    Fuse ................ H01M 4/13
                                                      252/182.1
2005/0136330 A1*    6/2005    Mao ................ C25D 17/10
                                                      429/231.95
(Continued)

FOREIGN PATENT DOCUMENTS

JP    2005-149946 A    6/2005
JP    2008-235247 A    10/2008
(Continued)

OTHER PUBLICATIONS

Korean Office Action dated Feb. 6, 2017 for Korean Patent Application No. KR 10-2013-0059787, from which subject U.S. Appl. No. 14/258,970 claims priority.

*Primary Examiner* — Maria Laios
(74) *Attorney, Agent, or Firm* — Knobbe, Martens, Olson & Bear, LLP

(57) ABSTRACT

Disclosed are a negative active material for a rechargeable lithium battery including a silicon-based material and graphite, wherein an average particle diameter (D50) of the graphite may range from about 5 μm to about 15 μm, and a Raman peak intensity ratio ($I_d/I_g$) of the graphite may range from about 0.1 to about 0.9, and a negative electrode and a rechargeable lithium battery including the same.

10 Claims, 3 Drawing Sheets

(51) Int. Cl.
    *H01M 4/133*    (2010.01)
    *H01M 4/134*    (2010.01)
    *H01M 4/587*    (2010.01)
    *H01M 10/0525*    (2010.01)

(52) U.S. Cl.
    CPC ............ *H01M 4/133* (2013.01); *H01M 4/134* (2013.01); *H01M 10/0525* (2013.01)

(56) References Cited

U.S. PATENT DOCUMENTS

| | | | | |
|---|---|---|---|---|
| 2005/0142440 A1* | 6/2005 | Yamaki | ................. | H01M 4/133 |
| | | | | 429/209 |
| 2006/0035149 A1* | 2/2006 | Nanba | ................. | H01M 4/0471 |
| | | | | 429/218.1 |
| 2006/0166098 A1* | 7/2006 | Tabuchi | ................. | H01M 4/134 |
| | | | | 429/232 |
| 2007/0077490 A1* | 4/2007 | Kim | ................. | C04B 35/62615 |
| | | | | 429/218.1 |
| 2010/0015514 A1* | 1/2010 | Miyagi | ................. | H01M 4/131 |
| | | | | 429/129 |
| 2013/0266847 A1* | 10/2013 | Noguchi | ........... | H01M 10/0525 |
| | | | | 429/163 |

FOREIGN PATENT DOCUMENTS

| | | | |
|---|---|---|---|
| JP | 2012-043546 A | 3/2012 | |
| JP | 2012-003997 A | 5/2012 | |
| KR | 10-2001-0113448 A | 12/2001 | |
| KR | 10-2007-0028245 A | 3/2007 | |
| KR | 10-2009-0086456 A | 8/2009 | |
| WO | WO2012/077712 A1 * | 6/2012 | ........ H01M 10/0569 |

\* cited by examiner

NEGATIVE ELECTRODE ACTIVE MATERIAL FOR RECHARGEABLE LITHIUM BATTERY, NEGATIVE ELECTRODE INCLUDING SAME, AND RECHARGEABLE LITHIUM BATTERY INCLUDING NEGATIVE ELECTRODE

INCORPORATION BY REFERENCE TO ANY PRIORITY APPLICATIONS

Any and all priority claims identified in the Application Data Sheet, or any correction thereto, are hereby incorporated by reference under 37 CFR 1.57. For example, this application claims priority to and the benefit of Korean Patent Application No. 10-2013-0059787 filed in the Korean Intellectual Property Office on May 27, 2013, the disclosure of which are incorporated herein by reference in its entirety.

BACKGROUND

Field

A negative active material for a rechargeable lithium battery, and a negative electrode and a rechargeable lithium battery including the same are disclosed.

Description of the Related Technology

A rechargeable lithium battery includes positive and negative electrodes including a material that can reversibly intercalate/deintercalate lithium ions as positive and negative active materials and an organic electrolyte solution or a polymer electrolyte solution charged between the positive and negative electrodes. Thus, the positive and negative electrodes intercalate and deintercalate lithium ions and produce electrical energy through oxidation and reduction reactions.

For the positive active material for a rechargeable lithium battery, lithium-transition metal oxide compounds capable of intercalating lithium such as $LiCoO_2$, $LiMn_2O_4$, $LiNi_{1-x}Co_xO_2$ ($0<x<1$), and the like has been used.

As for a negative active material for a lithium rechargeable battery, various carbon-based materials such as artificial graphite, natural graphite, and hard carbon capable of intercalating and deintercalating lithium ions have been used. Recently, the demand for a battery having higher energy densities has required a negative active material having high theoretical capacity density. Accordingly, Si, Sn, and Ge alloyed with lithium an oxide thereof and an alloy thereof have drawn attention. In particular, a Si-based negative active material has very high charge capacity and is widely applied to high-capacity batteries.

However, the volume of the silicon-based negative active material greater than or equal to about four times expands as a cycle goes, which deteriorates cycle-life and stability of a battery. Accordingly, an attempt to solve this problem has been made by using a technology of decreasing stoichiometric ratio of silicon, but the silicon-based negative active material still has a serious deterioration problem in terms of capacity, cycle-life, and stability, and the like according to the volume expansion. The embodiments set forth below addresses these problems and provides further advantages as well.

The above information disclosed in this Background section is only for enhancement of understanding of the background of the disclosure, and therefore, it may contain information that does not form the prior art already known in this country to a person of ordinary skill in the art.

SUMMARY

In some embodiments, a negative active material for a rechargeable lithium battery having a low volume expansion ratio and excellent cycle-life characteristics and safety is provided.

In other embodiments, a negative electrode for a rechargeable lithium battery including the negative active material is provided.

Yet another embodiment provides a rechargeable lithium battery including the negative electrode.

In another embodiment, a negative active material for a rechargeable lithium battery that includes a silicon-based material and graphite, wherein an average particle diameter (D50) of the graphite ranges from about 5 μm to about 15 μm, and a Raman peak intensity ratio ($I_d/I_g$) of the graphite ranges from about 0.1 to about 0.9, is provided.

In some embodiments, the Raman peak intensity ratio ($I_d/I_g$) of the graphite may range from about 0.1 to about 0.4.

In some embodiments, the average particle diameter (D50) of the graphite may range from about 10 μm to about 15 μm.

In some embodiments, the graphite may be included in an amount of about 50 wt % to about 97 wt % based on the total amount of the negative active material.

In some embodiments, the graphite may be included in an amount of about 80 wt % to about 97 wt % based on the total amount of the negative active material.

In some embodiments, the silicon-based material may include Si, $SiO_x$, a Si—C composite, a Si-Q alloy, or a combination thereof. The x may be $0<x<2$, and the Q may be an alkali metal, an alkaline-earth metal, Group 13 to 16 elements, a transition metal, a rare earth element, or a combination thereof, and not Si.

In some embodiments, an average particle diameter of the silicon-based material may range from about 1 μm to about 5 μm.

In some embodiments, the silicon-based material may be coated with a carbon material.

In some embodiments, the carbon material may be a pitch carbonized product, coke, or a combination thereof.

In another embodiment, a negative electrode for a rechargeable lithium battery that includes a current collector and a negative active material layer positioned on the current collector, wherein the negative active material layer includes the negative active material is provided.

In yet another embodiment, a rechargeable lithium battery includes the negative electrode for a rechargeable lithium battery; a positive electrode; and an electrolyte, is provided.

Some embodiments provide a negative electrode comprising: a current collector and a negative active material layer positioned on the current collector, wherein the negative active material layer comprises a negative active material, wherein the Raman peak intensity ratio ($I_d/I_g$) of the graphite ranges from about 0.1 to about 0.4.

Some embodiments provide a negative electrode comprising: a current collector and a negative active material layer positioned on the current collector, wherein the negative active material layer comprises a negative active material, wherein the average particle diameter (D50) of the graphite ranges from about 10 μm to about 15 μm.

Some embodiments provide a negative electrode comprising: a current collector and a negative active material layer positioned on the current collector, wherein the negative active material layer comprises a negative active material, wherein the graphite is included in an amount of about 50 wt % to about 97 wt % based on the total amount of the negative active material.

Some embodiments provide a negative electrode comprising: a current collector and a negative active material layer positioned on the current collector, wherein the negative active material layer comprises a negative active material, wherein the graphite is included in an amount of about 80 wt % to about 97 wt % based on the total amount of the negative active material.

Some embodiments provide a negative electrode comprising: a current collector and a negative active material layer positioned on the current collector, wherein the negative active material layer comprises a negative active material, wherein the silicon-based material comprises Si, SiOx, a Si—C composite, a Si-Q alloy, or a combination thereof, wherein, 0<x<2, and the Q is an alkali metal, an alkaline-earth metal, Group 13 to 16 elements, a transition metal, a rare earth element, or a combination thereof, and not Si.

Some embodiments provide a negative electrode comprising: a current collector and a negative active material layer positioned on the current collector, wherein the negative active material layer comprises a negative active material, wherein an average particle diameter (D50) of the silicon-based material may range from about 1 μm to about 5 μm.

Some embodiments provide a negative electrode comprising: a current collector and a negative active material layer positioned on the current collector, wherein the negative active material layer comprises a negative active material, wherein the silicon-based material is coated with a carbon material.

Some embodiments provide a negative electrode comprising: a current collector and a negative active material layer positioned on the current collector, wherein the negative active material layer comprises a negative active material, wherein the carbon material is a pitch carbonized product, coke, or a combination thereof.

Further embodiments are included in the following detailed description.

The negative active material for a rechargeable lithium battery according to the instant embodiments have a low volume expansion ratio, and the negative electrode and the instant rechargeable lithium battery including the negative active material has excellent cycle-life characteristics and stability.

BRIEF DESCRIPTION OF THE DRAWINGS

Features of the present disclosure will become more fully apparent from the following description and appended claims, taken in conjunction with the accompanying drawings. It will be understood these drawings depict only certain embodiments in accordance with the disclosure and, therefore, are not to be considered limiting of its scope; the disclosure will be described with additional specificity and detail through use of the accompanying drawings. An apparatus, system or method according to some of the described embodiments can have several aspects, no single one of which necessarily is solely responsible for the desirable attributes of the apparatus, system or method. After considering this discussion, and particularly after reading the section entitled "Detailed Description" one will understand how illustrated features serve to explain certain principles of the present disclosure.

DETAILED DESCRIPTION

Figure 1:
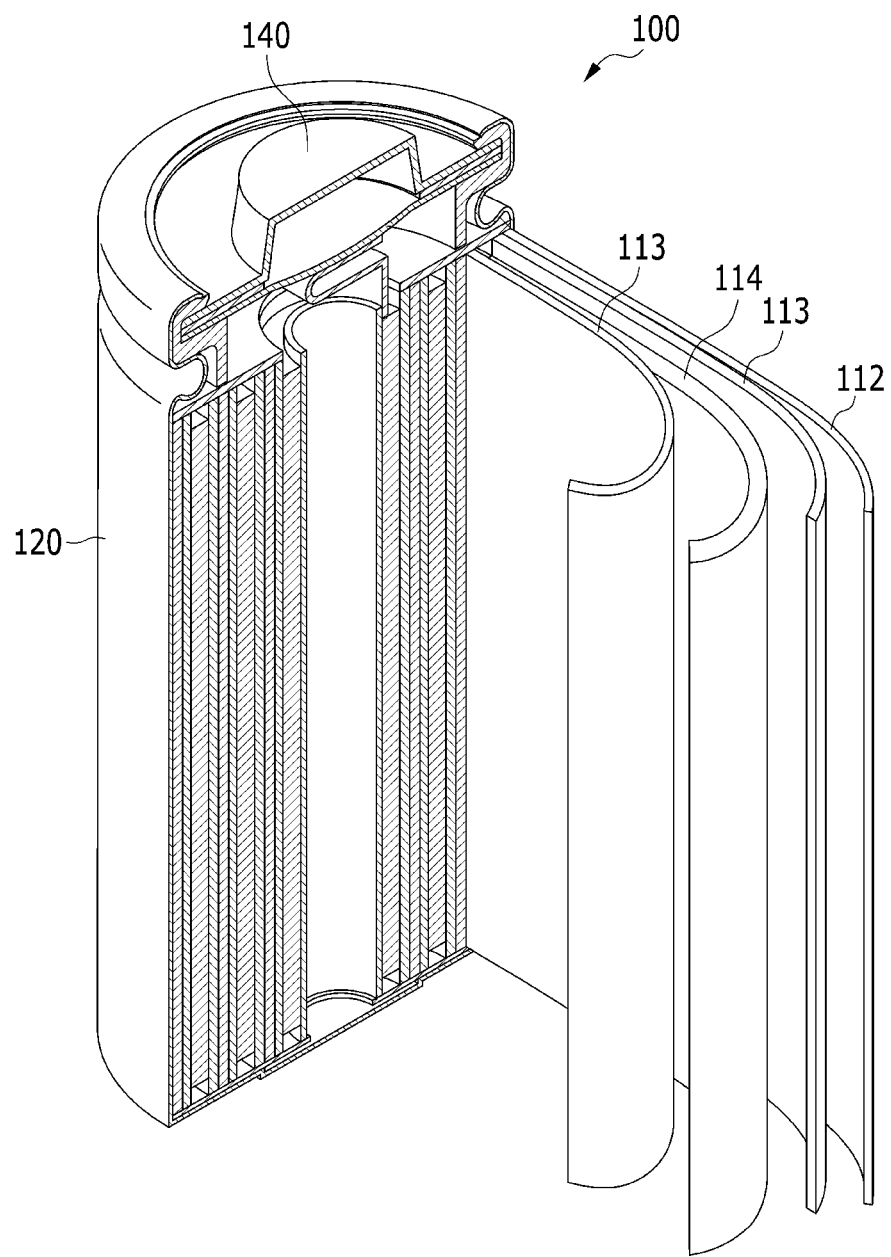
FIG. 1 is a schematic diagram showing a rechargeable lithium battery according to one embodiment.

Hereinafter, embodiments of the present disclosure are discussed in detail. However, these embodiments are exemplary, and this disclosure is not limited thereto.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

In some embodiments, a negative active material for a rechargeable lithium battery includes a silicon-based material and graphite, wherein an average particle diameter (D50) of the graphite ranges from about 5 μm to about 15 μm, and a Raman peak intensity ratio ($I_d/I_g$) of the graphite ranges from about 0.1 to about 0.9, is provided.

In some embodiments, the negative active material has a low volume expansion ratio. A negative electrode with the instant negative active material and a rechargeable lithium battery including the same may exhibit excellent safety and cycle-life characteristics.

The average particle diameter of the negative active material is described as D50, and the D50 indicates a particle size at 50% of a volume ratio in a cumulative size-distribution curve.

The average particle diameter (D50) of the graphite of the instant negative active material ranges from about 5 μm to about 15 μm, and specifically about 5 μm to about 14 μm, about 5 μm to about 13 μm, about 5 μm to about 12 μm, about 5 μm to about 11 μm, about 5 μm to about 10 μm, about 6 to about 15 μm, about 7 μm to about 15 μm, about 8 μm to about 15 μm, about 9 μm to about 15 μm, or about 10 μm to about 15 μm. When the graphite has an average particle diameter within the range, the negative active material may have a decreased volume expansion ratio.

The Raman peak intensity ratio ($I_d/I_g$) of the graphite of the instant negative active material indicates crystallinity of the graphite. The Raman analysis graph of the graphite shows a peak showing a crystalline part and another peak showing an amorphous part. The $I_g$ indicates intensity of a peak (G-peak, 1573 cm$^{-1}$) in the crystalline part, and the G-peak is generated when two neighboring carbon atoms in the graphite sheet are stretched in an opposite direction. The $I_d$ indicates intensity of a peak (D-peak, 1309 cm$^{-1}$) in the amorphous part, such that the D-peak is generated by deformation, defect, or the like of a lattice in amorphous carbon or a graphite sheet. The $I_d$ and $I_g$ are compared to define crystallinity of graphite. Herein, the higher the Raman peak intensity ratio ($I_d/I_g$) is for the graphite, the lower crystallinity the graphite has.

The Raman peak intensity ratio ($I_d/I_g$) of the graphite of the instant negative active material may range from about 0.1 to about 0.9, and specifically about 0.15 to about 0.85, about 0.2 to about 0.75, about 0.25 to about 0.65, about 0.28 to about 0.55, or about 0.30 to about 0.45. When the graphite has a Raman peak intensity ratio ($I_d/I_g$) within the range, the graphite has low crystallinity. When the graphite has a Raman peak intensity ratio ($I_d/I_g$) within the range, a negative active material including the graphite may effectively control an expansion ratio according to the charge and discharge, and a rechargeable lithium battery including the same may realize high cycle-life characteristics.

In some embodiments, the graphite of the instant negative active material may be natural graphite, artificial graphite, or a combination thereof. The graphite may be non-shaped, sheet-shaped, flake-shaped, spherical-shape or fiber-shaped.

In some embodiments, the graphite of the instant negative active material may be included in an amount of about 50 wt % to about 97 wt % based on the total amount of the negative active material. Specifically, the graphite may be included in an amount of about 80 wt % to about 97 wt %, about 80 wt % to about 90 wt %, or 90 wt % to 97 wt %. When the graphite is included within the range, the negative active material may exhibit decreased volume expansion and also exhibit improved safety and cycle-life characteristics of a rechargeable lithium battery contains such material.

In some embodiments, the silicon-based material of the instant negative active material may be Si, $SiO_x$, a Si—C composite, a Si-Q alloy, or a combination thereof. The x may be 0<x<2, and Q may be an alkali metal, an alkaline-earth metal, Group 13 to 16 elements, a transition metal, a rare earth element, or a combination thereof, and not Si. Specific examples of Q may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, or a combination thereof.

For example, the silicon-based material of the instant negative active material may be a mixture of $SiO_2$ and Si. Specifically, the Si may be distributed in a $SiO_2$ matrix.

A negative active material including such silicon-based material may provide a high-capacity rechargeable lithium battery having theoretical capacity of about 4400 mAh/g. When the volume of a silicon-based material in a negative active material expands greater than or equal to about four times the unchanged volume during the charge and discharge cycle and it may deteriorate safety or cycle-life characteristics of a battery. However, a negative active material according to one embodiment of the present disclosure has a low volume expansion ratio and thus may exhibit excellent safety and cycle-life characteristics of a battery.

In some embodiments, the silicon-based material in the instant negative active material may include silicon in an amount of about 0.1 wt % to about 10 wt % based on the total weight of the silicon-based material. Specifically, the silicon may be included in an amount of about 0.1 wt % to about 9 wt %, about 0.1 wt % to about 8 wt %, about 0.1 wt % to about 7 wt %, about 0.1 wt % to about 6 wt %, about 1 wt % to about 10 wt %, about 2 wt % to about 10 wt %, and about 3 wt % to about 10 wt %.

In general, as the amount of silicon in a silicon-based material increases, the volume expansion ratio increases, and thus, when the silicon is included in an amount of greater than or equal to about 5 wt %, battery performance may be greatly diminished, and when the silicon is included in an amount of greater than or equal to about 3 wt %, battery performance decreases. However, when a negative active material according to the instant embodiments is provided that includes silicon in an amount of greater than or equal to about 3 wt % or greater than or equal to about 5 wt % of the negative active material, excellent battery performance may result.

The silicon-based material of the instant negative active material may have an average particle diameter ranging from about 1 μm to about 5 μm, specifically, about 1 μm to about 4 μm, and more specifically, about 1 μm to about 3 μm. When the silicon-based material has an average particle diameter within the range, high-capacity may not only be obtained but the volume expansion ratio may also be decreased.

In some embodiments, the silicon-based material of the instant negative active material may be coated with a carbon material on the surface. For example, the silicon-based material may be coated with amorphous carbon on the surface. Examples of the amorphous carbon may be soft carbon, hard carbon, a mesophase pitch carbonized product, a fired coke, and the like. For example, the carbon material may be a pitch carbonized product, coke, or a combination thereof.

In some embodiments, the silicon-based material of the instant negative active material may be included in an amount of about 0.1 wt % to about 10 wt % based on the total amount of the negative active material. Specifically, the silicon-based material may be included in an amount of about 1 wt % to about 8 wt % and specifically, about 3 wt % to about 7 wt %. When the silicon-based material is included within the range, high-capacity may not only be achieved but the volume expansion ratio may also be decreased.

In another embodiment, there is provided a negative active material for a rechargeable lithium battery which includes a current collector and a negative active material layer positioned on the current collector, wherein the negative active material layer is the above-described negative electrode.

In some embodiments, the current collector of the instant rechargeable lithium battery may be anything having high conductivity without particular limitation, unless the material in the current collector causes a chemical change in a battery. The current collector may be for example a copper foil, a nickel foil, a stainless steel foil, a titanium foil, a nickel foam, a copper foam, a polymer substrate coated with a conductive metal, or a combination thereof.

In some embodiments, the current collector may have a thickness of about 3 μm to about 500 μm range, but is not particularly limited thereto.

In some embodiments, the negative active material layer may include a binder.

The binder improves binding properties of the particles of negative active material with one another and also binding to a current collector. Examples thereof may be polyvinylalcohol, carboxylmethylcellulose, hydroxypropylcellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

In some embodiments, the negative active material layer may include a conductive material.

The instant conductive material improves the conductivity of an electrode. Any electrically conductive material may be used as a conductive material, unless the material composed of causes a chemical change. Examples thereof may be a carbon-based material such as natural graphite, artificial graphite, carbon black, acetylene black, ketjen black, carbon fiber and the like; a metal-based material such as a metal powder or a metal fiber and the like of copper, nickel, aluminum, silver, and the like; a conductive polymer such as a polyphenylene derivative and the like; or a mixture thereof.

Yet another embodiment provides a rechargeable lithium battery including the negative electrode that includes the instant negative active material; a positive electrode; and an electrolyte.

FIG. 1 is an exploded perspective view showing a rechargeable lithium battery according to one embodiment. Referring to FIG. 1, a rechargeable lithium battery 100 according to one embodiment includes an electrode assembly including a positive electrode 114, a negative electrode 112 facing the positive electrode 114, a separator 113 interposed between the positive electrode 114 and negative electrode 112, and an electrolyte (not shown) impregnating the positive electrode 114, negative electrode 112, and separator 113, a battery case 120 housing the electrode assembly, and a sealing member 140 sealing the battery case 120.

In some embodiments, the rechargeable lithium battery may have any shape of cylindrical, prismatic, coin-type, pouch-type, and the like.

The negative electrode in the instant rechargeable lithium battery is the same as described above.

The positive electrode in the instant rechargeable lithium battery includes a current collector and a positive active material layer formed on the current collector, and the positive active material layer includes a positive active material.

In some embodiments, the positive active material may include lithiated intercalation compounds that reversibly intercalate and deintercalate lithium ions. Specifically, at least one composite oxide of lithium and a metal of cobalt, manganese, nickel, or a combination thereof may be used, and specific examples thereof may be a compound represented by one of the following chemical formulae:

$Li_aA_{1-b}R_bD^1_2$ (0.90≤a≤1.8 and 0≤b≤0.5);

$Li_aE_{1-b}R_bO_{2-c}D^1_c$ (0.90≤a≤1.8, 0≤b≤0.5 and 0≤c≤0.05);

$LiE_{2-b}R_bO_{4-c}D^1_c$ (0≤b≤0.5, 0≤c≤0.05);

$Li_aNi_{1-b-c}Co_bR_cD^1_\alpha$ (0.90≤a≤1.8, 0≤b≤0.5, 0≤c≤0.05 and 0<α≤2);

$Li_aNi_{1-b-c}Co_bR_cO_{2-\alpha}Z_\alpha$ (0.90≤a≤1.8, 0≤b≤0.5, 0≤c≤0.05 and 0<α<2);

$Li_aNi_{1-b-c}Co_bR_cO_{2-\alpha}Z_2$ (0.90≤a≤1.8, 0≤b≤0.5, 0≤c≤0.05 and 0<α<2);

$Li_aNi_{1-b-c}Mn_bR_cD^1_\alpha$ (0.90≤a≤1.8, 0≤b≤0.5, 0≤c≤0.05 and 0<α≤2);

$Li_aNi_{1-b-c}Mn_bR_cO_{2-\alpha}Z_\alpha$ (0.90≤a≤1.8, 0≤b≤0.5, 0≤c≤0.05 and 0<α<2);

$Li_aNi_{1-b-c}Mn_bR_cO_{2-\alpha}Z_2$ (0.90≤a≤1.8, 0≤b≤0.5, 0≤c≤0.05 and 0<α<2);

$Li_aNi_bE_cG_dO_2$ (0.90≤a≤1.8, 0≤b≤0.9, 0≤c≤0.5 and 0.001≤d≤0.1);

$Li_aNi_bCo_cMn_dGeO_2$ (0.90≤a≤1.8, 0≤b≤0.9, 0≤c≤0.5, 0≤d≤0.5 and 0.001≤e≤0.1);

$Li_aNiG_bO_2$ (0.90≤a≤1.8 and 0.001≤b≤0.1); $Li_aCoG_bO_2$ (0.90≤a≤1.8 and 0.001≤b≤0.1); $Li_aMnG_bO_2$ (0.90≤a≤1.8 and 0.001≤b≤0.1); $Li_aMn_2G_bO_4$ (0.90≤a≤1.8 and 0.001≤b≤0.1);

$QO_2$; $QS_2$; $LiQS_2$; $V_2O_5$; $LiV_2O_5$; $LiTO_2$; $LiNiVO_4$; $Li_{(3-f)}J_2(PO_4)_3$ (0≤f≤2); $Li_{(3-f)}Fe_2(PO_4)_3$ (0≤f≤2); and $LiFePO_4$.

In the above chemical formulae, A is Ni, Co, Mn, or a combination thereof; R is Al, Ni, Co, Mn, Cr, Fe, Mg, Sr, V, a rare earth element, or a combination thereof; $D^1$ is O, F, S, P, or a combination thereof; E is Co, Mn, or a combination thereof; Z is F, S, P, or a combination thereof; G is Al, Cr, Mn, Fe, Mg, La, Ce, Sr, V, or a combination thereof; Q is Ti, Mo, Mn, or a combination thereof; T is Cr, V, Fe, Sc, Y, or a combination thereof; and J is V, Cr, Mn, Co, Ni, Cu, or a combination thereof.

In some embodiments, the positive active material may include the positive active material with the coating layer, or a compound of the active material and the active material coated with the coating layer. The coating layer may include a coating element compound of an oxide of a coating element, hydroxide of a coating element, oxyhydroxide of a coating element, oxycarbonate of a coating element, or hydroxycarbonate of a coating element. The compound for the coating layer may be either amorphous or crystalline. The coating element included in the coating layer may be Mg, Al, Co, K, Na, Ca, Si, Ti, V, Sn, Ge, Ga, B, As, Zr, or a mixture thereof. The coating process may include any conventional processes as long as it does not causes any side effects on the properties of the positive active material (e.g., spray coating, immersing), which is well known to persons having ordinary skill in this art, so a detailed description thereof is omitted.

In some embodiments, the positive active material layer may include a binder and a conductive material.

The binder improves binding properties of the particles of the positive active material particles with one another and with a current collector. Examples of the binder may be polyvinylalcohol, carboxylmethylcellulose, hydroxypropylcellulose, diacetylcellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

The conductive material improves conductivity of an electrode. Any electrically conductive material may be used as a conductive material, unless the material it is composed of causes a chemical change. Examples thereof may be one or more of natural graphite, artificial graphite, carbon black, acetylene black, ketjen black, a carbon fiber, copper, nickel, aluminum, silver, and the like, a metal powder, a metal fiber, and the like. polyphenylene derivative and the like, a conductive material such as a polyphenylene derivative and the like.

In some embodiments, the current collector may include aluminum, but is not limited thereto.

The negative electrode and the positive electrode may be manufactured by mixing an active material, a conductive material, and a binder in a solvent to prepare an active material composition, and coating the composition on a current collector. The electrode manufacturing method is well known, and thus is not described in detail in the present specification. The solvent includes N-methylpyrrolidone and the like, but is not limited thereto.

The electrolyte of the instant rechargeable lithium battery includes a non-aqueous organic solvent and a lithium salt.

The non-aqueous organic solvent serves as a medium for transmitting ions taking part in the electrochemical reaction of a battery.

In some embodiments, the non-aqueous organic solvent may be a carbonate-based, ester-based, ether-based, ketone-based, alcohol-based, or aprotic solvent. The carbonate based solvent may be dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like, and the ester based solvent may be methyl acetate, ethyl acetate, n-propyl acetate, 1,1-dimethylethyl acetate, methylpropionate, ethylpropionate, γ-butyrolactone, decanolide, valerolactone, mevalonolactone, caprolactone, and the like. The ether based solvent may be dibutyl ether, tetraglyme, diglyme, dimethoxyethane, 2-methyltetrahydrofuran, tetrahydrofuran, and the like, and the ketone based solvent may be cyclohexanone, and the like. The alcohol based solvent may be ethanol, isopropyl alcohol, and the like, and the aprotic solvent may be nitriles such as R—CN (R is a hydrocarbon group having a C2 to C20 linear, branched, or cyclic structure, and may include a double bond, an aromatic ring, or an ether bond) and the like, amides such as dimethylformamide and the like, dioxolanes such as 1,3-dioxolane, and the like, sulfolanes, and the like.

In some embodiments, the non-aqueous organic solvent may be used singularly or in a mixture. When the organic solvent is used in a mixture, the mixture ratio may be controlled in accordance with a desirable battery performance.

The carbonate-based solvent is prepared by mixing a cyclic carbonate and a linear carbonate. The cyclic carbonate and the linear carbonate are mixed together in the volume ratio of about 1:1 to about 1:9. Within this range, performance of electrolyte may be improved.

In some embodiments, the non-aqueous organic electrolyte may be further prepared by mixing a carbonate-based solvent with an aromatic hydrocarbon-based solvent. The carbonate-based and the aromatic hydrocarbon-based solvents may be mixed together in a volume ratio ranging from about 1:1 to about 30:1.

The aromatic hydrocarbon-based organic solvent may be an aromatic hydrocarbon-based compound represented by the following Chemical Formula 1.

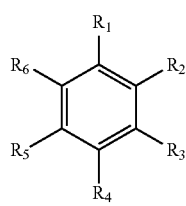

Chemical Formula 1

In the above Chemical Formula 1, $R_1$ to $R_6$ are each independently hydrogen, a halogen, a C1 to C10 alkyl group, a C1 to C10 haloalkyl group, or a combination thereof.

The aromatic hydrocarbon-based organic solvent may be benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, xylene, or a combination thereof.

In certain embodiments, in order to improve battery cycle-life, the non-aqueous electrolyte may further include vinylene carbonate or an ethylene carbonate-based compound of the following Chemical Formula 2.

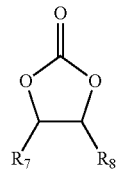

Chemical Formula 2

In the above Chemical Formula 2, $R_7$ and $R_8$ are each independently hydrogen, a halogen, a cyano group (CN), a nitro group ($NO_2$), or a C1 to C5 fluoroalkyl group, wherein at least one of the $R_7$ and $R_8$ is a halogen, a cyano group (CN), a nitro group ($NO_2$), or a C1 to C5 fluoroalkyl group.

Examples of the instant ethylene carbonate-based compound are difluoro ethylenecarbonate, chloroethylene carbonate, dichloroethylene carbonate, bromoethylene carbonate, dibromoethylene carbonate, nitroethylene carbonate, cyanoethylene carbonate, fluoroethylene carbonate, and the like. The amount of the vinylene carbonate or the ethylene carbonate-based compound used to improve cycle life may be adjusted within an appropriate range.

The lithium salt for the instant rechargeable lithium battery is dissolved in an organic solvent, supplies lithium ions in a battery, operates a basic operation of the rechargeable lithium battery, and improves lithium ion transportation between positive and negative electrodes therein. Examples of the lithium salt may be $LiPF_6$, $LiBF_4$, $LiSbF_6$, $LiAsF_6$, $LiC_4F_9SO_3$, $LiClO_4$, $LiAlO_2$, $LiAlCl_4$, $LiN(C_xF_{2x+1}SO_2)(C_yF_{2y+1}SO_2)$ (wherein, x and y are natural numbers), LiCl, LiI, $LiB(C_2O_4)_2$ (lithium bis(oxalato) borate; LiBOB) or a combination thereof, which is used as a supporting electrolytic salt. The lithium salt may be used in a concentration ranging from about 0.1 M to about 2.0 M. When the lithium salt is included at the above concentration range, an electrolyte may excellent performance and lithium ion mobility due to optimal electrolyte conductivity and viscosity.

In some embodiments, the rechargeable lithium battery may include a separator. The separator may include anything commonly used in a general lithium battery as long as separating a negative electrode from a positive electrode and providing a transporting passage of lithium ion. In other words, it may have a low resistance to ion transport and an excellent impregnation for electrolyte. For example, it may be selected from a glass fiber, polyester, polyethylene, polypropylene, polytetrafluoroethylene (PTFE), or a combination thereof. It may have a form of a non-woven fabric or a woven fabric. For example, for the lithium ion battery, polyolefin-based polymer separator such as polyethylene, polypropylene or the like is mainly used. In order to ensure the heat resistance or mechanical strength, a coated separator including a ceramic component or a polymer material may be used. Selectively, it may have a mono-layered or multi-layered structure.

Hereinafter, Examples and Comparative Examples of the instant embodiments are illustrated. These examples, however, are not in any sense to be interpreted as limiting the scope of the instant embodiments.

Examples 1 and 2 and Comparative Examples 1 to 4: Manufacture of Half-Cells

A negative active material layer composition was prepared by mixing a negative active material, and a binder in an amount provided in the following Table 1 and dispersing the mixture into water. The negative active material layer composition was coated on a silicon-based material copper foil and then, dried and compressed, manufacturing a negative electrode.

The negative electrode, a lithium metal as a counter electrode for the negative electrode, and a polypropylene separator (STAR20, Asahi Chemical Co., Tokyo, Japan) were put in a battery case, and an electrolyte solution was injected into the battery case, manufacturing a rechargeable lithium battery cell.

Herein, the electrolyte solution was prepared by mixing ethylenecarbonate (EC):diethylcarbonate (DEC):ethylmethylcarbonate (EMC) in a volume ratio of 3:5:2 and dissolving 1.2M $LiPF_6$ therein.

TABLE 1

|  |  |  |  |  | Example | | Comparative Example | | | |
|---|---|---|---|---|---|---|---|---|---|---|
|  |  |  |  |  | 1 | 2 | 1 | 2 | 3 | 4 |
| Negative active material | Silicon-based material (A) |  |  |  | 5 | 5 | 5 | 5 | 5 | 5 |
|  | Graphite (B) | B-1 | D50 10 | $I_d/I_g$ 0.310 | 93 |  |  |  |  |  |
|  |  | B-2 | D50 15 | $I_d/I_g$ 0.318 |  | 93 |  |  |  |  |
|  |  | B-3 | D50 25 | $I_d/I_g$ 0.320 |  |  | 93 |  |  |  |
|  |  | B-4 | D50 10 | $I_d/I_g$ 0.065 |  |  |  | 93 |  |  |
|  |  | B-5 | D50 15 | $I_d/I_g$ 0.058 |  |  |  |  | 93 |  |
|  |  | B-6 | D50 25 | $I_d/I_g$ 0.052 |  |  |  |  |  | 93 |
| Binder |  |  |  |  | 2 | 2 | 2 | 2 | 2 | 2 |

Each amount in Table 1 is based on wt %.

Each component used in Example is illustrated as follows.
Negative Active Material
Silicon-Based Material Silicon oxide (ShinEtsu Co., Ltd. Tokyo, Japan) including 5 wt % of silicon, having an average particle diameter of 3 µm, and coated with a pitch carbonized product on the surface was used.
(B) Graphite PB-XG, ZG made by Nippon Carbon Co., Ltd. Yokohama, Japan was used and had the following properties.

(B-1) Graphite having an average particle diameter of 10 µm and a Raman peak intensity ratio ($I_d/I_g$) of 0.310 was used.

(B-2) Graphite having an average particle diameter of 15 µm and a Raman peak intensity ratio ($I_d/I_g$) of 0.318 was used.

(B-3) Graphite having an average particle diameter of 25 µm and a Raman peak intensity ratio ($I_d/I_g$) of 0.320 was used.

(B-4) Graphite having an average particle diameter of 10 µm and a Raman peak intensity ratio ($I_d/I_g$) of 0.065 was used.

(B-5) Graphite having an average particle diameter of 15 µm and a Raman peak intensity ratio ($I_d/I_g$) of 0.058 was used.

(B-6) Graphite having an average particle diameter of 25 µm and a Raman peak intensity ratio ($I_d/I_g$) of 0.052 was used.

Experimental Example 1: Expansion Ratio of Negative Active Material

The rechargeable lithium battery cells (half-cells) according to Examples 1 and 2 and Comparative Examples 1 to 4 were charged after formation, and then, volume expansion ratios of negative electrodes in the battery cells were measured and provided in the following Table 2 and FIG. 2.

TABLE 2

|  | Average volume expansion ratio (%) |
|---|---|
| Example 1 | 38.3 |
| Example 2 | 40.7 |
| Comparative Example 1 | 47.3 |
| Comparative Example 2 | 50.3 |
| Comparative Example 3 | 47.0 |
| Comparative Example 4 | 49.8 |

Figure 2:
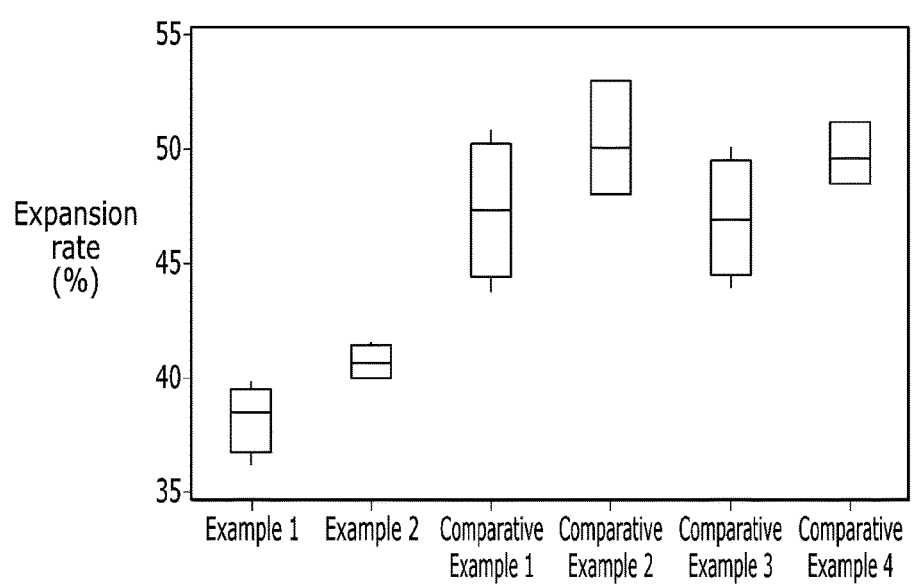
FIG. 2 is a graph showing volume expansion ratios of negative electrodes for a rechargeable lithium battery according to the Example and the Comparative Example.

Referring to Table 2 and FIG. 2, the rechargeable lithium battery cells according to Examples showed improved expansion ratio compared with the rechargeable lithium battery cells according to Comparative Examples.

Examples 3 and 4 and Comparative Examples 5 to 8: Manufacture of Rechargeable Lithium Battery Cell (Full-Cell)

The negative electrodes according to Examples 1 and 2 and Comparative Examples 1 to 4 and positive electrodes prepared by mixing $LiCoO_2$ (L&F materials. Daegu, Korea) as a positive active material, carbon black as a conductive material, and polyvinylidene fluoride (PVdF) as a binder in a mass ratio of 96:2:2 in N-methyl pyrrolidone as a solvent were used.

The negative and positive electrodes and a polypropylene separator (STAR20, Asahi Tokyo, Japan) were put in a battery case, and an electrolyte solution was injected thereinto, manufacturing rechargeable lithium battery cells. The electrolyte solution was prepared by mixing ethylene carbonate (EC):diethyl carbonate (DEC):ethylmethyl carbonate (EMC) in a volume ratio of 3:5:2 and dissolving 1.2M $LiPF_6$ therein.

Experimental Example 2: Cycle-Life Characteristic

The rechargeable lithium battery cells according to Examples 3 and 4 and Comparative Examples 5 to 8 were measured regarding a capacity ratio of 100 cycles relative to 1 cycle under a condition of 1C, and the results are provided in the following Table 3 and FIG. 3.

TABLE 3

|  | Capacity retention (%) |
|---|---|
| Example 3 | 68 |
| Example 4 | 63 |
| Comparative Example 5 | 64 |
| Comparative Example 6 | 58 |

TABLE 3-continued

| | Capacity retention (%) |
|---|---|
| Comparative Example 7 | 54 |
| Comparative Example 8 | 53 |

Figure 3:
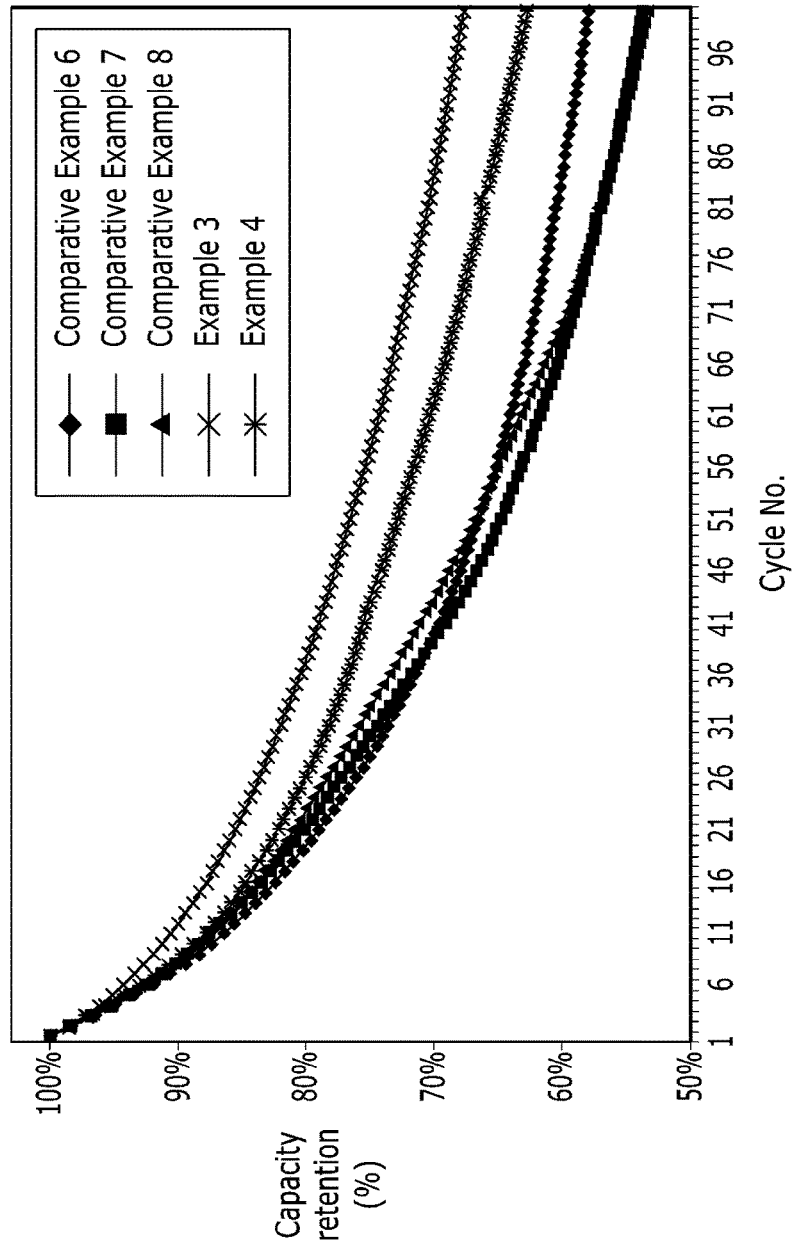
FIG. 3 is a graph showing capacity retentions of rechargeable lithium batteries according to the Example and the Comparative Example.

Referring to Table 3 and FIG. 3, the rechargeable lithium battery cell according to Example had remarkably improved capacity retention compared with the rechargeable lithium battery cell according to Comparative Example.

While the instant embodiments have been described in connection with what are presently considered to be practical exemplary embodiments, it will be appreciated by those skilled in the art that various modifications and changes may be made without departing from the scope of the present disclosure. It will also be appreciated by those of skill in the art that parts included in one embodiment are interchangeable with other embodiments; one or more parts from a depicted embodiment can be included with other depicted embodiments in any combination. For example, any of the various components described herein and/or depicted in the Figures may be combined, interchanged or excluded from other embodiments. With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity. Thus, while the present disclosure has described certain exemplary embodiments, it is to be understood that the instant embodiments are not limited to the disclosed embodiments, but, on the contrary, is intended to cover various modifications and equivalent arrangements included within the spirit and scope of the appended claims.

What is claimed is:

1. A negative active material for a rechargeable lithium battery, comprising
a silicon-based material, a binder and graphite,
wherein the silicon-based material is coated with a carbon material and the silicon-based material is Si or $SiO_x$, $0<x<2$;
wherein the silicon-based material includes silicon in an amount of about 0.1 wt % to about 8 wt % based on the total weight of the negative active material;
wherein the carbon material is a pitch carbonized product, coke, or a combination thereof;
wherein an average particle diameter (D50) of the graphite ranges from about 5 μm to about 15 μm, and
wherein the graphite is included in an amount of 90 wt % to 97 wt % based on the total amount of the negative active material and a Raman peak intensity ratio ($I_d/I_g$) of the graphite ranges from about 0.1 to about 0.4, wherein the Ig indicates intensity of a peak (G-peak, 1573 $cm^{-1}$) and the Id indicates intensity of a peak (D-peak, 1309 $cm^{-1}$).

2. The negative active material of claim 1, wherein the average particle diameter (D50) of the graphite ranges from about 10 μm to about 15 μm.

3. The negative active material of claim 1, wherein the silicon-based material is $SiO_x$,
wherein, $0<x<2$.

4. The negative active material of claim 1, wherein an average particle diameter (D50) of the silicon-based material may range from about 1 μm to about 5 μm.

5. The negative active material of claim 1, wherein the carbon material is a pitch carbonized product.

6. A negative electrode comprising:
a current collector and a negative active material layer positioned on the current collector,
wherein the negative active material layer comprises a negative active material comprising a silicon-based material, a binder and graphite, wherein the silicon-based material is coated with a carbon material and the silicon-based material is Si or $SiO_x$, $0<x<2$, wherein the silicon-based material includes silicon in an amount of about 0.1 wt % to about 8 wt % based on the total weight of the negative active material; wherein the carbon material is a pitch carbonized product, coke, or a combination thereof, wherein an average particle diameter (D50) of the graphite ranges from about 5 μm to about 15 μm, wherein the graphite is included in an amount of 90 wt % to 97 wt % based on the total amount of the negative active material and a Raman peak intensity ratio ($I_d/I_g$) of the graphite ranges from about 0.1 to about 0.4, and wherein the Ig indicates intensity of a peak (G-peak, 1573 $cm^{-1}$) and the Id indicates intensity of a peak (D-peak, 1309 $cm^{-1}$).

7. The negative electrode of claim 6, wherein the average particle diameter (D50) of the graphite ranges from about 10 μm to about 15 μm.

8. The negative electrode of claim 6, wherein the silicon-based material is $SiO_x$,
wherein, $0<x<2$.

9. The negative electrode of claim 6, wherein an average particle diameter (D50) of the silicon-based material may range from about 1 μm to about 5 μm.

10. A negative electrode comprising:
a current collector and a negative active material layer positioned on the current collector,
wherein the negative active material layer comprises a negative active material comprising a silicon-based material, a binder and graphite,
wherein the silicon-based material is coated with a carbon material and the silicon-based material is Si or $SiO_x$, $0<x<2$;
wherein the silicon-based material includes silicon in an amount of about 0.1 wt % to about 8 wt % based on the total weight of the negative active material;
wherein the carbon material is a pitch carbonized product, coke, or a combination thereof;
wherein the Ig indicates intensity of a peak (G-peak, 1573 $cm^{-1}$) and the Id indicates intensity of a peak (D-peak, 1309 $cm^{-1}$);
wherein an average particle diameter (D50) of the graphite ranges from about 5 μm to about 15 μm,
wherein the graphite is included in an amount of 90 wt % to 97 wt % based on the total amount of the negative active material and a Raman peak intensity ratio (Id/Ig) of the graphite ranges from about 0.1 to about 0.9, wherein the silicon-based material is coated with a carbon material and the carbon material is a pitch carbonized product, coke, or a combination thereof.

* * * * *